United States Patent [19]

Holroyd

[11] Patent Number: 4,908,654
[45] Date of Patent: Mar. 13, 1990

[54] METHOD AND APPARATUS FOR AUTOMATIC PRINTING FROM MICROFILM OF SHORT IMAGE AREAS

[75] Inventor: Bruce A. Holroyd, Gates, N.Y.

[73] Assignee: Eastman Kodak Company, Rochester, N.Y.

[21] Appl. No.: 270,597

[22] Filed: Nov. 14, 1988

[51] Int. Cl.⁴ .............................................. G03B 27/52
[52] U.S. Cl. ......................................... 355/41; 355/64
[58] Field of Search ................... 358/280, 294; 355/41, 355/45, 64

[56] References Cited

U.S. PATENT DOCUMENTS

| | | | |
|---|---|---|---|
| 3,385,161 | 5/1968 | Sage et al. | 355/7 |
| 4,623,935 | 11/1986 | Mukai et al. | 358/280 |
| 4,693,591 | 9/1987 | Saijo et al. | 355/64 X |
| 4,700,237 | 10/1987 | Yoshioka et al. | 358/287 |
| 4,708,464 | 11/1987 | Otsuki et al. | 355/45 |
| 4,739,368 | 4/1988 | Lachut et al. | 355/14 R |
| 4,750,021 | 6/1988 | Holroyd et al. | 355/41 |

FOREIGN PATENT DOCUMENTS 3309578 9/1984 Fed. Rep. of Germany .
59-216133 12/1984 Japan .
61-165746 7/1986 Japan .

OTHER PUBLICATIONS

Operator's Instructions 3M, 900–page Search Reader–Printer.
Operator's Manual Kodak IMT-350 Microimage Terminal Printer.
Kodak Ektamate II Toning and Printing Access, A-19101.

Primary Examiner—Donald A. Griffin
Attorney, Agent, or Firm—Norman Rushefsky

[57] ABSTRACT

Apparatus and method are disclosed for automatic printing of an enlarged reproduction of an image frame stored on a microfilm without reproduction of images found on adjacent image frames and without the need to reposition the image frame adjacent frame marks found on a display screen. The method and apparatus of the invention provide for automatic calculation of the distance between the top of the image and the upper frame marks on the apparatus' display screen and the distance between the leading edges of the image frame to be reproduced and an adjacent image frame. In response to these calculations, an enlarged reproduction is produced that excludes information from adjacent image frames even though the image reproduced is of relatively short length compared to the copy sheet it is printed upon.

14 Claims, 6 Drawing Sheets

METHOD AND APPARATUS FOR AUTOMATIC PRINTING FROM MICROFILM OF SHORT IMAGE AREAS

BACKGROUND OF THE INVENTION

1. Field of the Invention

This invention relates to a method and apparatus for making enlargements from microfilm.

2. Description of the Prior Art

In U.S. Pat. No. 4,750,021, apparatus for printing enlargements from microfilm is described. This apparatus comprises a microfilm reader-printer. This reader-printer apparatus includes means for quickly retrieving a desired image frame stored on say a 16mm microfilm and an optical system for imaging the microfilm image onto a screen during a viewing mode. An electrophotographic reproduction engine is also provided for reproducing enlargements of the microfilm image onto copy sheets such as plain paper. An advantageous feature of this apparatus is that there is the capability for an operator to control reproduction to a selected portion of the image that appears on the viewing screen. Thus, if an image of a projected image frame is of relatively short length it is quite likely that at least a portion of a second image frame will also appear on the screen. The operator can select an image length to be printed by using indicia associated with the screen and suitable buttons to have the reproduction process controlled so that only the image length segment selected for reproduction is reproduced and thereby preclude the reproduction of information on adjacent image frames. Alternatively, the operator can select an automatic operation mode wherein a reproduction of only the image frame is made. However, in order to accomplish this the image frame needs to be positioned with its topmost edge in register with frame registration marks located at the top of the display screen. While automatic means may be provided to locate the image in this position this may be an inconvenience for the operator who prefers, from a comfort point of view, to view the image so that it is properly positioned for his or her best viewing.

U.S. Pat. No. 4,623,935 describes an apparatus and method for electronically scanning an image frame on a microfilm for transmission of the signals used in reproducing the image for copying same. The apparatus scans the image frame and detects the black borders surrounding same. The apparatus then electronically deletes the transmission of signals reproducing the black borders to provide copies without black borders. In this apparatus there is a need for circuitry to perform electronic scanning of an image and its borders for distinguishing image information from border information.

It is therefore an object of the invention to provide an apparatus and method for producing enlargements of images stored on microfilm without having images from more than one image frame appear on an enlargement and without the need for adjustment of the image frame from a position selected by the operator.

SUMMARY OF THE INVENTION

The above and other objects are achieved in a method and apparatus for printing wherein a control means provides signals related to 1. the distance between one edge of the image frame to be printed and a reference on say a viewing screen and 2. the distance between an edge of an adjacent image frame and the reference (or alternatively the frame pitch length) and uses these signals to inhibit image formation of information on adjacent image frames.

DETAILED DESCRIPTION OF THE PREFERRED EMBODIMENTS

Because reader-printer microfilm apparatus are well known, the present description will be directed in particular to elements forming part of or cooperating more directly with the present invention. Elements of reader-printer apparatus not specifically shown or described herein are selectable from those known in the prior art.

Figure 1:
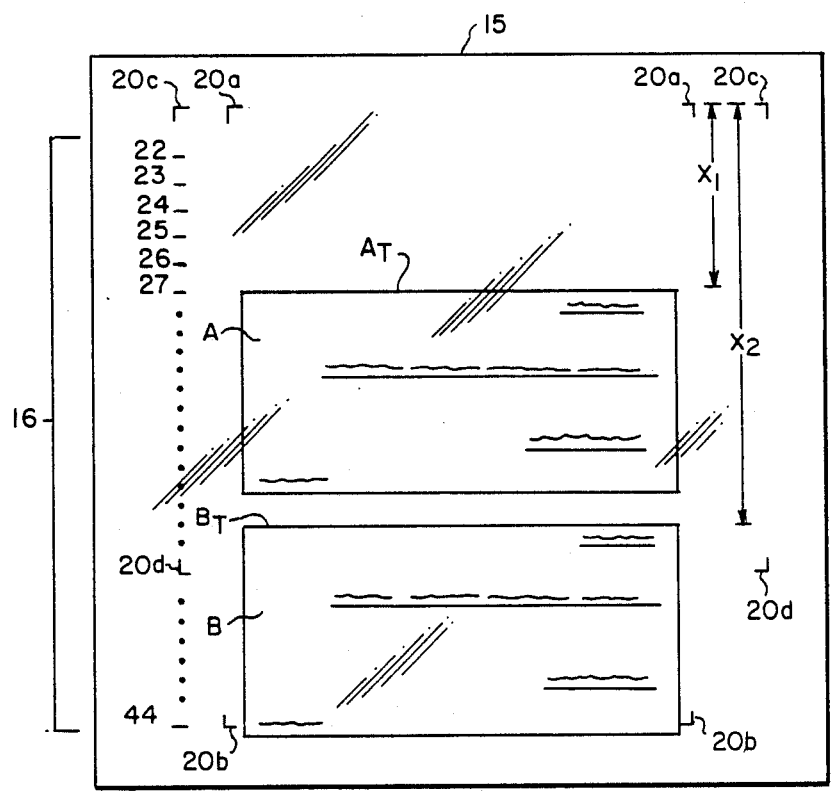
FIG. 1 is an illustration of a microfilm viewing screen of reader-printer apparatus used in the invention.

With reference to FIG. 1, the display screen 15 of an exemplary microfilm reader-printer 10 (FIG. 3) is shown illustrating projected images of adjacent image frames present on the microfilm. As an example, projected images A and B on the screen may be those of checks. The screen includes various indicium etched or painted thereon including conventional upper frame registration marks 20a and 20c, respectively, and lower frame registration marks 20b and 20d, respectively. As the images of either check A or B on the screen are smaller than the distance between upper and lower registration marks 20a and 20b, a conventional reproduction of the area between marks 20a and 20b will result in both checks being imaged on the same copy sheet. As noted above, the object of the invention is to reproduce, say, the image of check A on a copy sheet without the need for the operator to adjust the position of the image of check A from that shown. Also, associated with screen 15 are image length selection marks 16 which allow an operator to manually designate portions of the image frame to be reproduced, in this regard also note Latchut et al, U.S. Pat. No. 4,739,368, the entire contents of which are incorporated herein by this reference.

Figure 2:
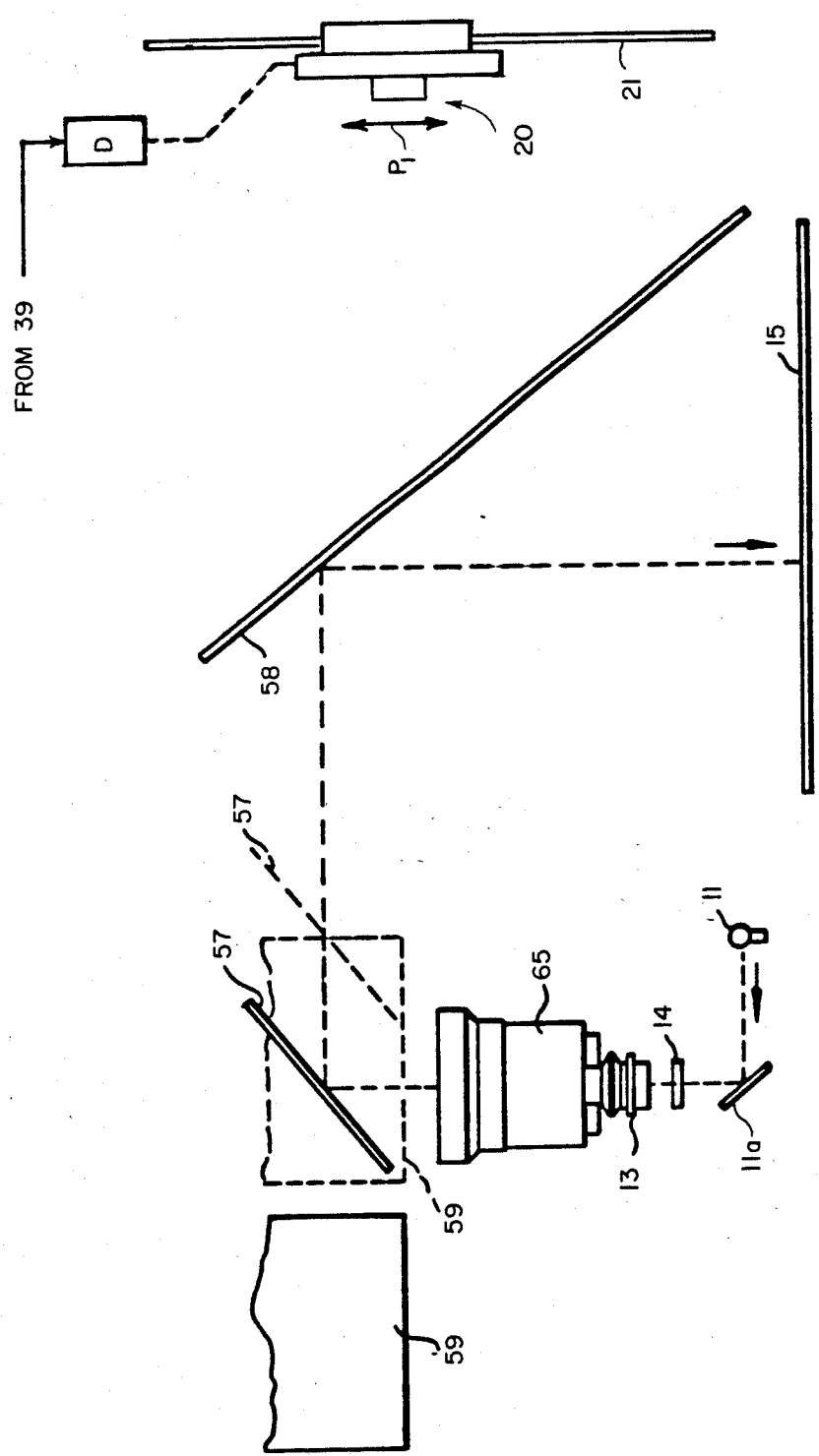
FIG. 2 is a schematic of the mirror arrangement for projecting an image of a microfilm upon the display screen of FIG. 1.

With reference now to FIG. 2, the display screen 15 of the microfilm reader-printer apparatus 10 is shown in combination with a lamp 11 which in combination with a mirror 11a serves as a light source for projecting images from microfilm 14 via mirrors 57, 58 and lens and prism assembly 13, 65 onto screen 15. Mirror 58 is movable so that in a print mode a different mirror 59 is moved into position by conventional means to project the image on the microfilm image frame now in the print or projection gate 8 onto a one-dimensional; i.e., linear, image reading device 20 (such as a charge coupled device image scanner). Reading device 20 moves in the directions indicated by the arrows $P_1$ to scan the images previously displayed on the screen 15 and to generate electrical signals representing same. The image reading device 20 is supported on rails 21 and driven by a driver D, such as a motor (or other mechanical arrangement), mechanically coupled thereto.

Figure 3:
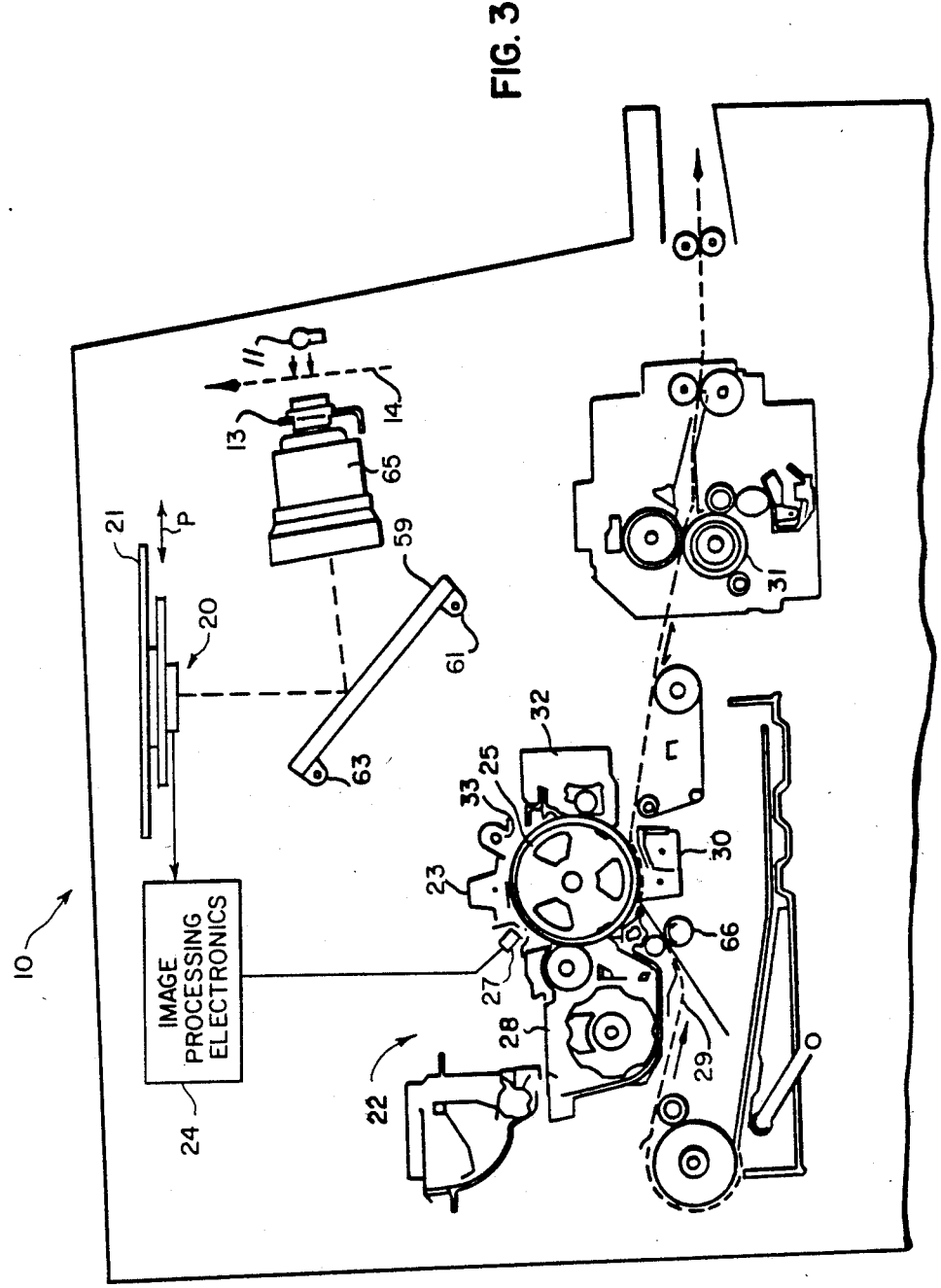
FIG. 3 is a schematic elevational view of various portions of reader-printer apparatus used in the invention.

With reference now to FIG. 3, the reader-printer apparatus 10 additionally includes an electrophotographic printer engine 22. This engine includes a corona charger 23 that is electrically coupled to a highly negative electrical power supply to form a corona discharge of, say, negative ions that flow towards the surface of drum 25 as it is rotated. A grid electrode may be electrically biased by a grid power supply to control the voltage level of charge deposited on the drum. During the exposure process, the image previously seen on the screen 15 is scanned in increments by CCD sensor array 20 and processed electronically line-by-line by image processing electronics 24. This image processing is of the conventional type well known in the electrophotographic microfilm and facsimile arts. The image data is processed so as to contain bits of logic data 1's and 0's representing a spot of light to be imaged or not to be imaged on the drum. Preferably, this data is imaged upon the drum by a laser or LED printhead 27. The latter comprises a linear array of several thousand LED's. The document page is scanned in increments upon the rotating drum to form a latent electrostatic image of the document page. The latent image is developed as the drum rotates past a development station 28 wherein negatively charged electrostatic toner is selectively attracted to areas of the drum which have been exposed to imaging radiation to form a developed visible image. The developed image on the drum is then transferred to a copy sheet 29 of, say, plain paper by advancing the copy sheet so that a leading edge thereof is moved by rollers 66 into engagement with the drum in synchronism with the edge of the developed image of the document page. The copy sheets may be stored as discrete sheets of standard size in a cassette located below the drum 25. These sizes are thus independent of the image frame being reproduced on such sheets. As segments of the copy sheet are continuously moved into engagement with the drum, an image transfer corona charger 30 applies a positive charge to the backside of the sheet. As each sheet segment leaves contact with the drum the negatively charged toner remains attached to the sheet and the image is thus transferred to the sheet. The sheet is then passed between a pair of fusing rollers 31 to fix the toner to the sheet. The drum is then rotated past a cleaning station 32 wherein residual toner not transferred to the sheet is removed. An erase lamp 33 is illuminated to erase charge from the drum prior to forming the next copy.

Figure 5:
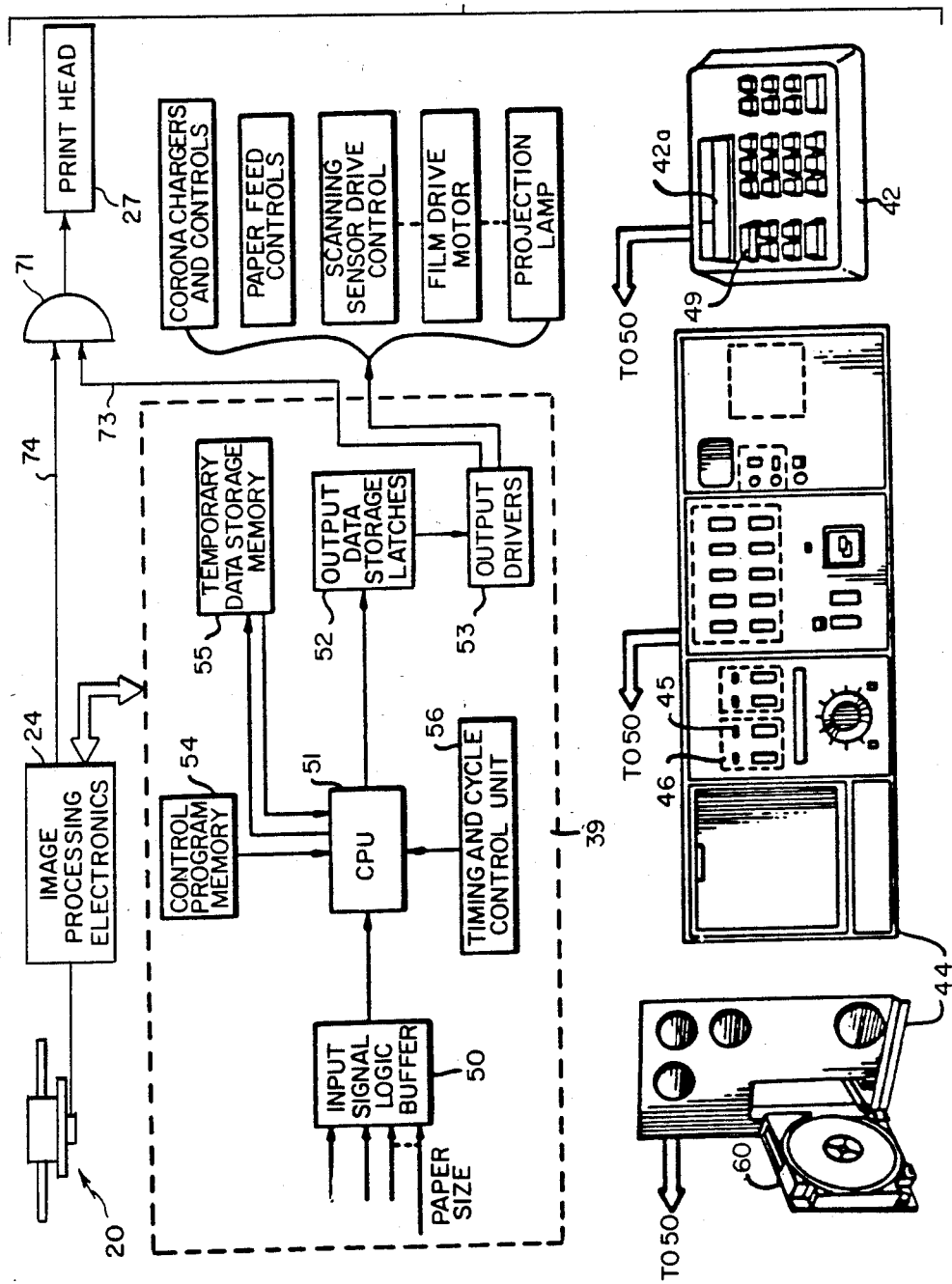
FIG. 5 is a schematic of a control system for controlling the apparatus of FIG. 1

With reference now to FIG. 5, a control panel 44 is shown forming a part of the apparatus 10 and includes various control buttons to control exposure etc. A slot is provided in the control panel for receiving a magazine 60 having a supply of microimages formed on a strip of microfilm. The apparatus includes controls for automatically threading the strip into a film drive when the magazine is inserted into the slot. A keyboard 42 is also provided and includes various control buttons and alphanumeric display 42a. Inputs from the various control buttons are applied through input signal logic buffer 50 of the reader-printer's logic and control unit (LCU) 39. The input signals to signal buffer 50 consist of logic level digital signals which may be stored in a temporary data storage memory 55 in the microprocessor based LCU. Output data for controlling the apparatus are provided by the LCU with output data storage latches 52 and output drivers 53. The drivers in turn directly control operation of the apparatus' components such as motor(s), clutches, solenoids, power switches, lamps, chargers and various displays. The LCU's processing functions can be programmed by changing instructions stored in the computer's control program memory 54. The LCU also includes a central processing unit 51 and timing and cycle control unit means 56.

Figure 4:
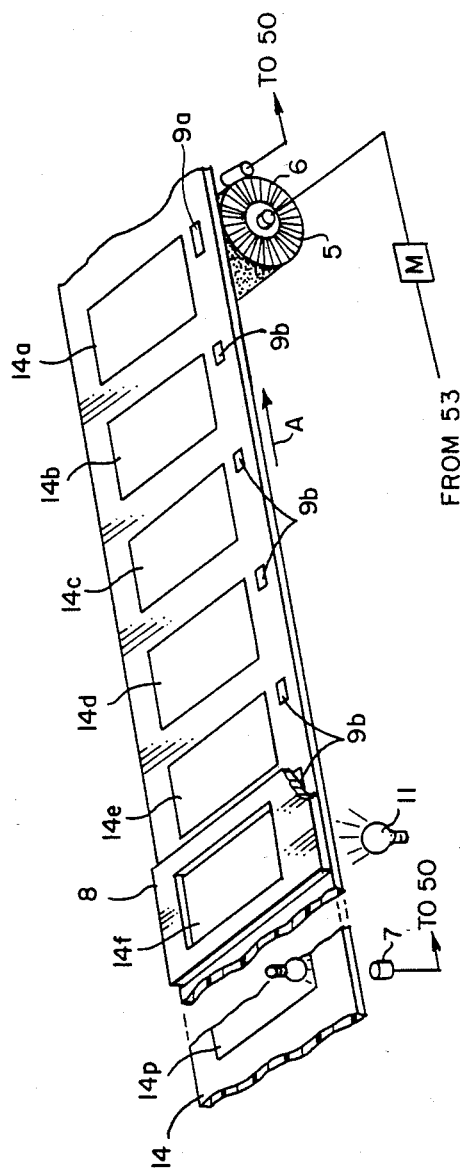
FIG. 4 is a schematic of a microfilm strip transported in the apparatus of FIG. 1 and illustrates certain structure in the apparatus for cooperation with the strip.

With reference now to FIG. 4, it may be noted that each of the image frames 14a-14f, 14p of microfilm strip 14 has adjacent thereto an indicium (9a, 9b), such as a black mark, located near the leading edge of the frame. It will be noted that image frame 14a has an indicium 9a that is larger than the other frames shown. This larger indicium may be used to designate this frame as a chapter head of its respective chapter of image document pages. Within the group of pages 14a-14f are a related set of documents that have been designated as such during the production of the microfilm. An edge of each indicium is located in alignment with the loading edge of its respective image frame. The image frame leading edge is oriented on the strip 14 in a direction perpendicular to the direction of advancement of the strip. As is conventional in apparatus of this type, a motor M is provided to rotate a drive roller 5 to advance a desired image frame into a print gate 8 wherein it is positioned for viewing on the screen 15 or for printing as described above. As noted above, the microfilm is preferably stored within a conventional magazine having an appropriate supply spool. A take-up spool may be provided as part of the apparatus and the film is payed out from supply to take-up by advancing the film in the direction of the arrow A (FIG. 4). The motor M is operated by the LCU and precise location of the image frame in the film gate is accomplished by the use of an indicia sensor 7, which may be a photoelectric device, that is adapted to provide a pulse to the LCU for each indicium sensed. This sensor 7 will be located several image frames upstream of the print gate 8. An encoder 6 is incorporated in one of the drive rollers for providing pulses to the the LCU for each small increment of advancement of the film strip. Since a chapter head indicium 9a is larger than indicia for other pages of that chapter, the duration of a pulse for which the chapter head indicium is sensed by the photosensor 7 is larger and denotes to the LCU that a chapter head page image frame is on the film. Also, it will be understood that in the prior art apparatus as the microfilm strip is advanced, information has been provided to the LCU and is stored in table form in the temporary memory 55 as to the type of image frames that are present between the sensor 7 and the print gate 8 and the distances or pitches between adjacent image frames. These signals are provided by signals from encoder 6 and indicia sensor 7 and are used by the LCU to calculate when a selected image frame is precisely located in the print gate 8.

In microfilm reader-printer apparatus of the type described, it is known to allow an operator to input a first numerical code that will allow the logic controlling the reader to accurately position an image of a microfilm frame on the reader screen in a desired position. Thus, the operator can by inputting this code place the top frame line of an image frame either adjacent the upper registration marks 20a or selectively at desired locations spaced therefrom. This is an operator convenience feature which allows each operator to position images at a comfortable position for viewing. This is done by the operator inputting a numerical code through keyboard 42 which code number is related to the vertical distance of the image's top frame line from the registration marks 20a. This numerical code is also related to the number of encoder pulses needed to move the microfilm image frame from a position where it would be located in the print gate so that its image is projected with the top image frame line vertically aligned with registration marks 20a to the position shown in FIG. 1 wherein this top image frame line is at a vertical distance $x_1$ from the registration marks.

Figure 6:
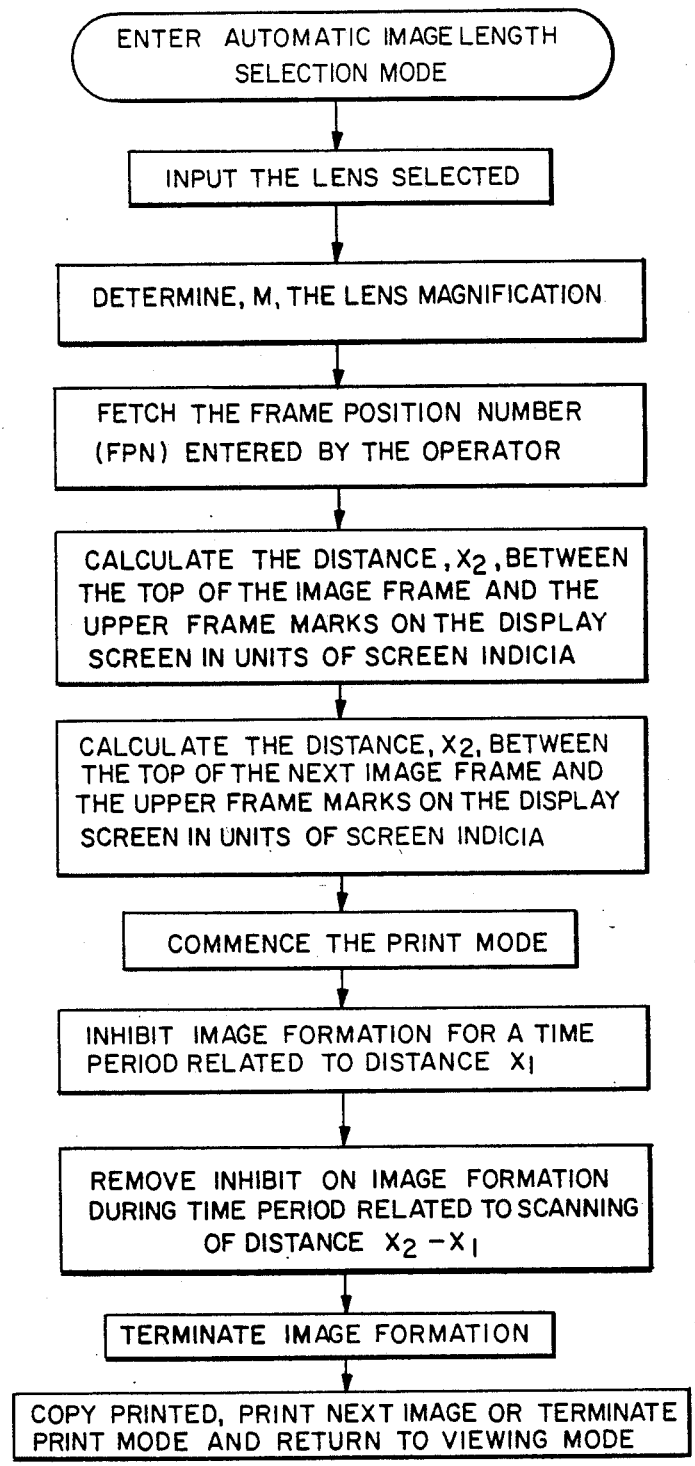
FIG. 6 is a flow chart of a computer program for controlling the apparatus of FIG. 3.

Description will now be provided with reference to the flowchart shown in FIG. 6. Programming of minicomputers or microprocessors is a conventional skill well understood in the art. The disclosure provided herein is written to enable a programmer having ordinary skill in the art to produce an appropriate program for the computer. The particular details of any such program would, of course, depend upon the architecture of the selected computer.

Assume that the operator has inputted a second numerical code via keyboard 42 to place the apparatus 10 in an automatic image length selection mode. Upon depression of print button 49 and with image frame 14f in the print gate, the program for the automatic image length selection mode is called up. In this mode, signals are provided to input signal buffer 50 as to which one of several available lens magnifications is being used. The means for providing these signals may take the form of switches or a rheostat calibrated to provide preassigned signal information when one of a group of lenses is shifted into the optical path of the reader-printer. Alternatively, the operator may input via a keyboard entry a code to choose the desired lens and the information concerning lens magnification of the lens concurrently in use is stored in the LCU's memory to eliminate the need for the operator to repeatedly identify same. When this signal is "read" by the LCU 39, the CPU stores in temporary memory 55 a value M which is the lens magnification for the lens now in the optical path.

While the image frame 14f was previously moved toward the print gate, the encoder wheel 6 provided a pulse to input signal logic buffer 50 for each incremental advancement of the frame. These pulses were counted by the LCU beginning with when the frame's indicium was sensed and terminated when the indicium of the next image frame was sensed. This effectively determines the pitch length of the image frame. Assume that image frame 14f shown in FIG. 4 is a relatively short image frame and that its image A projected on screen 15 in FIG. 1 does not fill the screen 15 between the markings 20a and 20b. This will cause a portion of the adjacent image frame to also be visible as image B on screen 15 and this portion of the adjacent image frame will be prevented automatically from being reproduced by the apparatus and method of the invention without the need for the top image frame line of image A to be located vertically aligned with the registration marks 20a.

The CPU under instructions from the control program stored in memory 54 fetches the first numerical code (frame position number) entered by the operator and stored in temporary memory 55. As noted above, this code was input by the operator to position the top image frame line of each image at a convenient vertical placement for viewing. The distance, $x_1$, is calculated employing this number and the projection lens magnification. This distance as noted above represents the vertical distance on the screen between the top of the image frame line and the registration marks 20a. This distance is calculated in terms of units of screen indicia as provided on the left side of the screen and stored as a signal representing same in temporary memory 55. As may be noted in FIG. 1, the screen 15 includes a series of uniformly spaced (b=0.4 inches or 1 cm) apart etched ruler-like fiducial marks formed to one side of the projected image frame. Adjacent each or alternate marks is a number selected from 22 to 44 (only 22-27 and 44 and are illustrated in the drawing). The mark closest to the top frame line of image 19 is designated as number 22 and that furthest from this frame line is number 44. These marks are in numerical order and thus represent progressive vertical distances from the registration marks 20a. Next, the control program instructs the CPU to calculate the vertical distance $x_2$ between the top of the next adjacent image frame B and the upper frame registration marks 20a on the display screen and to store same in units of screen indicia. The print mode is then initiated and operated as described above. That is, the mirror 57, is moved by means not shown so that mirror 59 now projects the image of microfilm 14 onto image reading device 20. The CPU, however, through signals provided via output drivers 53 to one input 73 of logic AND gate 71 initially inhibits the transmission of data signals to the printhead 27 sensed by image reading device 20 and processed by the image processing electronics and transmitted over a second input 74 to AND gate 71. This period of inhibition is related to the period of time it takes motor driver D to advance the image reading device 20 to advance from a position wherein it is adapted to sense any images along a line coincident with the registration marks 20a to a position wherein it is adapted to sense an image at the top image frame line of image A. Thereafter, the inhibit signal is removed from line 73 and the stream of processed data signals for image information scanned line-by-line in image A is transferred to printhead 27 for printing as described above.

When the image reading device 20 reaches the position coincident with reading of the top frame line of image B as determined by the signals stored in memory 55 representing length $X_2$ the CPU again instructs driver 53 to provide an inhibit signal over line 73 to block the AND gate's 71 ability to transmit data to printhead 27. The electrostatic image thus recorded on the drum 25 is thereafter developed by development station 28 and transferred to a copy sheet 29 and represents only the information found in image A.

A specific working example illustrating the above will now be provided. Assume the display screen 15 has a distance of 11.2 inches between upper and lower registration marks 20a and 20b, respectively. Also assume that in transporting the microfilm 14 three is a distance of 0.0033 inches between encoder pulses and a lens magnification, M, of 40×X. It is noted that for this apparatus 765 encoder pulses are always counted to move the top image frame line of an image frame from the reading station 7 to a point where this top image frame line is projected at the center of display screen 15. In order to move the top image frame line from the center of display screen 15 to the top registration marks 20a the number of encoder pulses of corresponding movement of the microfilm 14 is calculated as 5.6" (14.2 cm), i.e., one-half the display screen height, divided by 0.0033 and further divided by M. Thus, the location of the top registration mark is calculated as equal to 765+5.6/.0033/M or 765+(1697/M). The present location of the top image frame line of the image frame to be reproduced is known from the operator's previous entry of the frame position number (FPN) to locate the image frame as a convenint position for viewing. Assume the current FPN is 788. Also assume that the image length selection indicia 16 on display screen 15 are spaced at 0.4″ (1 cm) apart. The distance $X_1$ in units of screen indicia as shown in FIG. 1 can be calculated in accordance with the following formula:

$$X_1 = \frac{\left[765 + \frac{1697}{M} - FPN\right](.0033)(M)}{0.4} + 21$$

Note that 21 is added as the screen indicia starts with 22, but due to tolerances this is lowered to 21 to ensure that all of the image area of image frame A is reproduced. With the above formula $X_1$ for this example is calculated to be $X_1 = 27$. As may be noted from FIG. 1, the top image frame line $A_T$ of image frame A is located adjacent screen indicia unit 27.

The distance $X_2$ in terms of screen indicia may be calculated by adding $X_1$, as calculated above, with use of the distance in encoder pulses between the top frame line, $A_T$, of image frame A and the top frame line, $B_T$, of image frame B as sensed on microfilm 14. Assume the distance between top image frame lines of images A and B is 23 encoder pulses then:

$$X_2 = X_1 + \frac{\text{(Distance in encoder pulses } A_T \to B_T)(.0033)(M)}{0.4}$$

or $$X_2 = 27 + \frac{(23)(.0033)(40)}{.4} = 35$$

$X_2$ is preferably reduced by a small amount (1 or 2 units) to ensure that no part of the adjacent image frame is printed.

While the invention has been described with apparatus that electronically prints the information, the invention may also be used to advantage with an optical reproduction apparatus, an example of one of which is described in U.S. Pat. No. 4,750,021.

The distance $X_2$ as broadly defined herein relates to the length of the image frame A even though $X_2$ may be alternatively counted directly by relating the number of encoder pulses between the registration marks 20a and the top frame line $B_T$ of image frame B.

The preferred embodiment of the invention has been described with reference to indicia marks 9a, 9b located aligned with the top image frame line of each microfilm image frame. It is known, however, that certain microfilm recording equipment records indicia marks that are spaced or offset some fixed distance from this top image frame line. Means can be provided for automatically detecting this fixed distance or otherwise allowing the operator to input this information so that the teachings of the invention can also be utilized in producing prints from microfilm with the indicia marks offset from the top image frame line with accounting for such offset in the algorithm as taught for use in my invention.

There has thus been described a method and apparatus for recording wherein an image positioned for comfortable viewing by an operator is recorded automatically without the need for repositioning of the image frame or for the operator to further identify the location of the image frame. There is also obviated the need for the apparatus to include complex discriminating circuitry capable of determining what is image area versus what is image border area.

Although the above detailed description has been made with particular reference to a preferred embodiment, it will be understood that variations and modifications can be effected within the spirit and scope of the present invention.

I claim:

1. In an apparatus for printing enlargements of image frames stored on a storage medium in miniature form the apparatus including display means for displaying an enlargement of the desired image frame to be reproduced, means for automatically locating the image frame for display on said display means, operator enterable selection means for cooperating with said automatic locating means for controlling said locating means so that said image frame is initially displayed automatically at a position convenient for viewing by said operator in accordance with his/her selection, reproducing means for forming an enlargement of one image frame upon a copy sheet of a size not substantially dependent upon the length of the image frame to be printed, the improvement which comprises:

control means for determining a first parameter related to the distance between a first reference associated with said image frame and a second reference associated with said apparatus and independent of said first reference and for determining a second parameter related to the length of said image frame and in response generating signals to control said reproducing means to reproduced said image frame on said copy sheet without reproducing an adjacent image frame on said same copy sheet and without the need for the operator to adjust the displayed image frame from that position selected for convenient viewing.

2. The apparatus of claim 1 and wherein the display means includes an indicium for establishing a reference position for locating an image on the display means and wherein said second reference is related to the location of said indicium.

3. The apparatus of claim 2 and wherein the first reference is an indicium located on said storage medium adjacent the image frame and said control means includes sensing means for sensing an indicium associated with each image frame.

4. The apparatus of claim 3 and wherein the sensing means is located relative to each image frame to sense the indicia external to the image frames.

5. The printer apparatus of claims 1, 2, 3, or 4, and wherein the reproducing means includes a photoconductive surface; means for moving the surface relative to stations performing operations on the surface; charge providing means for producing a uniform electrostatic charge upon the surface as the surface is being moved relative thereto; illumination means for exposing onto the surface light that has been modulated by incremental segments of information on the image frame selected for reproduction to form an electrostatic image of the information; means for developing the electrostatic image; and means for transferring the developed image to the copy sheet.

6. The apparatus of claim 5 and including means for electronically scanning the image information on said image frame to be reproduced and for generating electrical signals related to the image information scanned and said reproducing means reproducing said image information in response to said electrical signals.

7. The apparatus of claim 1 and wherein the storage medium is microfilm and the apparatus further comprises projection means for projecting an image of an image frame located at a projection gate.

8. The apparatus of claim 7 and wherein the projection means includes means for optically projecting the image of an image frame located at a projection gate onto a viewing screen of said display means.

9. The apparatus of claims 1, 7 or 8, and including means for electronically scanning the image information on said image frame to be reproduced and for generating electrical signals related to the image information scanned and said reproducing means reproduces said image information in response to said electrical signals.

10. In a method for printing enlargements of image frames stored on a storage medium in miniature form, the method including the steps of displaying an enlargement of the desired image frame to be reproduced on a display screen, automatically locating the image frame for display on said display screen at a position convenient for viewing by said operator in accordance with his/her selection, reproducing an enlargement of one image frame upon a copy sheet of a size not substantially dependent upon the length of the image frame to be printed, the improvement which comprises:

determining in response to movement of said storage medium relative to a sensor a first parameter related to the distance between a first reference associated with said image frame and a second reference associated with said apparatus and independent of said first reference and determining a second parameter related to the length of said image frame and in response generating signals to control said reproducing means to reproduce said image frame on said copy sheet without reproducing an adjacent image frame on said same copy sheet and without the need for the operator to adjust the displayed image frame from that selected for convenient viewing.

11. The method of claim 10 and wherein the display includes an indicium for establishing a reference position for locating an image on the display means and wherein said second reference is related to the location of said indicium.

12. The method of claim 11 and wherein the first reference is an indicium located on said storage medium adjacent the image frame.

13. The method of claim 10 and wherein the storage medium is microfilm and an image of an image frame located at a projection gate is projected onto said display means.

14. The method of claims 11, 12 or 13 and including the steps of electrically scanning the image information on said image frame to be reproduced and generating electrical signals related to the image information scanned and reproducing said image information in response to said electrical signals.

* * * * *